United States Patent
Zhou

(10) Patent No.: US 9,396,690 B2
(45) Date of Patent: Jul. 19, 2016

(54) LCD PANEL

(71) Applicant: SHENZHEN CHINA STAR OPTOELECTRONICS TECHNOLOGY CO., LTD., Shenzhen, Guangdong (CN)

(72) Inventor: Xiu-feng Zhou, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 424 days.

(21) Appl. No.: 14/165,542

(22) Filed: Jan. 27, 2014

(65) Prior Publication Data

US 2014/0139416 A1 May 22, 2014

Related U.S. Application Data

(63) Continuation-in-part of application No. PCT/CN2011/078679, filed on Aug. 21, 2011.

(30) Foreign Application Priority Data

Jul. 27, 2011 (CN) ................. 2011 2 0268598 U

(51) Int. Cl.
*G09G 3/36* (2006.01)
*G02F 1/1362* (2006.01)

(52) U.S. Cl.
CPC ........ *G09G 3/3648* (2013.01); *G02F 1/136286* (2013.01); *G09G 3/3614* (2013.01); *G09G 2300/0426* (2013.01); *G09G 2330/021* (2013.01)

(58) Field of Classification Search
CPC .............. G09G 3/3648; G09G 3/3614; G09G 2300/0426; G09G 2330/021; G02F 1/136286
See application file for complete search history.

(56) References Cited

U.S. PATENT DOCUMENTS

| | | | |
|---|---|---|---|
| 8,035,610 B2 | 10/2011 | Hsu | |
| 2008/0117348 A1* | 5/2008 | Chen | G09G 3/3648 349/46 |
| 2009/0096943 A1* | 4/2009 | Uehara | G02B 27/2214 349/37 |
| 2010/0259699 A1* | 10/2010 | Yen | G02F 1/136286 349/38 |
| 2010/0315402 A1* | 12/2010 | Hashimoto | G09G 3/3614 345/211 |
| 2011/0069046 A1 | 3/2011 | Ko et al. | |
| 2011/0090139 A1* | 4/2011 | Chiang | G09G 3/3648 345/87 |

FOREIGN PATENT DOCUMENTS

| | | |
|---|---|---|
| CN | 101169532 | 4/2008 |
| CN | 101303493 | 11/2008 |
| CN | 102023442 | 4/2011 |
| JP | 10104576 | 4/1998 |
| JP | 2008276180 | 11/2008 |

\* cited by examiner

*Primary Examiner* — Aneeta Yodichkas

(57) ABSTRACT

An LCD panel includes first to fifth data lines, which are sequentially arranged, intersecting first to third scan lines, which are sequentially arranged, for forming first to fourth pixel units sequentially arranged in an identical row as well as fifth to eighth pixel units sequentially arranged in another row. The first pixel unit and the fourth pixel unit are respectively coupled to the first data line and the fifth data line, and the second pixel unit and the third pixel unit are respectively coupled to the second data line and the fourth data line. The fifth pixel unit and the eighth pixel unit are respectively coupled to the second data line and the fourth data line, and both the sixth pixel unit and the seventh pixel unit are coupled to the third data line.

13 Claims, 4 Drawing Sheets

LCD PANEL

FIELD OF THE INVENTION

The present invention relates to the field of a liquid crystal display (LCD), and especially to an LCD panel.

BACKGROUND OF THE INVENTION

With a growing popularity of the LCD, the LCD is demanded for better functions.

Referring to FIG. 1, FIG. 1 is a schematic drawing illustrating pixel structures of an LCD panel in the prior art. The LCD panel includes m data lines D"1~D"m and n scan lines G"1~G"n. The data lines intersect the scan lines, and two adjacent data lines intersect two adjacent scan lines to define a pixel unit (not labeled). A thin film transistor (TFT) and a liquid crystal capacitor (not shown) are disposed on each pixel unit.

Data signals that are transmitted on the data lines D"1~D"m can be divided into data signals of positive polarity and data signals of negative polarity reference to a common voltage Vcom which is 0 v. The data signals of positive polarity means that the voltages of data signals are higher than the common voltage Vcom, and the data signals of negative polarity means that the voltages of data signals are lower than the common voltage Vcom. When a data signal of positive polarity and a data signal of negative polarity both have the same gray scale value, theoretically, they have the same display effects.

Liquid crystal molecules have followed common character: when both sides of a liquid crystal layer are applied to electric field and if the direction of the electric field is kept constant for a long time, the characteristics of the liquid crystal molecules are destroyed. That is, the liquid crystal molecules fail to rotate in response to changes of the electric field for forming various gray scales. Therefore, the direction of the electric field has to change every a period of time for reversing the liquid crystal molecules so as to prevent the characteristics of the liquid crystal molecules from being destroyed. There are a variety of driving methods to realize the reversal of the liquid crystal molecules in the LCD field, such as dot inversion, 1+2 dot inversion, column inversion, and row inversion.

When the driving method of the 1+2 dot inversion is employed in the above-mentioned LCD panel, in the case of the pixel units in each row, the direction of the electric field of the liquid crystal capacitance in $(4k-3)$th and $(4k)$th columns of the pixel units is opposite to the direction of the electric field of the liquid crystal capacitance in $(4k-2)$th and $(4k-1)$th columns of the pixel units. Thus, the polarity of the gray scale voltages of the data lines D"$4k-3$ and D"$4k$ is opposite to the polarity of the gray scale voltages of the data lines D"$4k-2$ and D"$4k-1$, where K is an arbitrary natural number. In addition, the direction of the electric field of the liquid crystal capacitance in odd rows of the pixel units and even rows of the pixel units are opposite. Thus, the voltages of the data lines D"$4k-3$ and D"$4k$ as well as the data lines D"$4k-2$ and D"$4k-1$ have to continuously switch their polarity in a frame time T as shown in FIG. 2. However, the frequent polarity switching must increase power consumption of the LCD panel, resulting in waste of resources.

SUMMARY OF THE INVENTION

An objective of the present invention is to provide an LCD panel to overcome the drawback that the frequent polarity switching on the data lines must increase the power consumption of the LCD panel driven by using the 1+2 dot inversion in the prior art and the waste of the resources.

To achieve the foregoing objective, an LCD panel constructed in the present invention includes: a plurality of data lines and a plurality of scan lines, the data lines being perpendicular and intersecting the scan lines, two adjacent data lines intersecting two adjacent scan lines to define a pixel unit. A first data line, a second data line, a third data line, a fourth data line, and a fifth data line, which are sequentially arranged, intersect a first scan line, a second scan line, and a third scan line, which are sequentially arranged, for forming eight pixel units, which comprises a first pixel unit, a second pixel unit, a third pixel unit, and a fourth pixel unit sequentially arranged in an identical row and comprises a fifth pixel unit, a sixth pixel unit, a seventh pixel unit, and an eighth pixel unit sequentially arranged in another row. The eight pixel units are designated as a pixel unit set.

In the identical row of the four pixel units, the first pixel unit and the fourth pixel unit are respectively coupled to the first data line and the fifth data line, and the second pixel unit and the third pixel unit are respectively coupled to the second data line and the fourth data line.

In the another row of the four pixel units, the fifth pixel unit and the eighth pixel unit are respectively coupled to the second data line and the fourth data line, and both the sixth pixel unit and the seventh pixel unit are coupled to the third data line.

The first pixel unit and the third pixel unit are coupled to the first scan line, and all the second pixel unit, the fourth pixel unit, the sixth pixel unit, and the eighth pixel unit are coupled to the second scan line, and both the fifth pixel unit and the seventh pixel unit are coupled to the third scan line. A thin film transistor being disposed in each of the pixel units.

In one row of the four pixel units of the pixel unit set, sources of the thin film transistors of the first pixel unit and the fourth pixel unit are respectively coupled to the first data line and the fifth data line, and sources of the thin film transistors of the second pixel unit and the third pixel unit are respectively coupled to the second data line and the fourth data line.

In the another row of the four pixel units of the pixel unit set, sources of the thin film transistors of the fifth pixel unit and the eighth pixel unit are respectively coupled to the second data line and the fourth data line, and both sources of the thin film transistors of the sixth pixel unit and the seventh pixel unit are coupled to the third data line.

In the LCD panel of the present invention, the pixel units coupled to an identical data line are respectively coupled to different scan lines.

In the LCD panel of the present invention, a first data line, a second data line, a third data line, a fourth data line, and a fifth data line, which are sequentially arranged, intersect a first scan line, a second scan line, and a third scan line, which are sequentially arranged, for forming eight pixel units, which comprises a ninth pixel unit, a tenth pixel unit, a eleventh pixel unit, and a twelfth pixel unit sequentially arranged in a first row and comprises a thirteenth pixel unit, a fourteenth pixel unit, a fifteenth pixel unit, and an sixteenth pixel unit sequentially arranged in a second row. The eight pixel units are designated as a pixel unit set.

In the first row of the four pixel units, the ninth pixel unit and the twelfth pixel unit are respectively coupled to the second data line and the fourth data line, and both the tenth pixel unit and the eleventh pixel unit are coupled to the third data line.

In the second row of the four pixel units, the thirteenth pixel unit and the sixteenth pixel unit are respectively coupled to the first data line and the fifth data line, and the fourteenth pixel unit and the fifteenth pixel unit are respectively coupled to the second data line and the fourth data line.

In the LCD panel of the present invention, in the first row of the pixel units, both the ninth pixel unit and the eleventh pixel unit are coupled to the second scan line, and both the tenth pixel unit and the twelfth pixel unit are coupled to the first scan line.

In the second row of the four pixel units, both the thirteenth pixel unit and the fifteenth pixel unit are coupled to the second scan line, and both the fourteenth pixel unit and the sixteenth pixel unit are coupled to the third scan line.

In the LCD panel of the present invention, gates of the thin film transistors of the pixel units coupled to an identical data line are coupled to different scan lines.

An objective of the present invention is to provide an LCD panel to overcome the drawback that the frequent polarity switching on the data lines must increase the power consumption of the LCD panel driven by using the 1+2 dot inversion in the prior art and the waste of the resources.

To achieve the foregoing objective, an LCD panel constructed in the present invention includes: a plurality of data lines and a plurality of scan lines, the data lines being perpendicular and intersecting the scan lines, two adjacent data lines intersecting two adjacent scan lines to define a pixel unit.

A first data line, a second data line, a third data line, a fourth data line, and a fifth data line, which are sequentially arranged, intersect a first scan line, a second scan line, and a third scan line, which are sequentially arranged, for forming eight pixel units, which comprises a first pixel unit, a second pixel unit, a third pixel unit, and a fourth pixel unit sequentially arranged in an identical row and comprises a fifth pixel unit, a sixth pixel unit, a seventh pixel unit, and an eighth pixel unit sequentially arranged in another row. The eight pixel units are designated as a pixel unit set.

In the identical row of the four pixel units, the first pixel unit and the fourth pixel unit are respectively coupled to the first data line and the fifth data line, and the second pixel unit and the third pixel unit are respectively coupled to the second data line and the fourth data line.

In the another row of the four pixel units, the fifth pixel unit and the eighth pixel unit are respectively coupled to the second data line and the fourth data line, and both the sixth pixel unit and the seventh pixel unit are coupled to the third data line.

In the LCD panel of the present invention, the pixel units coupled to an identical data line are respectively coupled to different scan lines.

In the LCD panel of the present invention, in a first row of the four pixel units of the pixel unit set, the first pixel unit and the fourth pixel unit are respectively coupled to the first data line and the fifth data line, and the second pixel unit and the third pixel unit are respectively coupled to the second data line and the fourth data line.

In a second row of the four pixel units of the pixel unit set, the fifth pixel unit and the eighth pixel unit are respectively coupled to the second data line and the fourth data line, and both the sixth pixel unit and the seventh pixel unit are coupled to the third data line.

In the LCD panel of the present invention, The first pixel unit and the third pixel unit are coupled to the first scan line, and all the second pixel unit, the fourth pixel unit, the sixth pixel unit, and the eighth pixel unit are coupled to the second scan line, and both the fifth pixel unit and the seventh pixel unit are coupled to the third scan line. A thin film transistor being disposed in each of the pixel units.

In the LCD panel of the present invention, A first data line, a second data line, a third data line, a fourth data line, and a fifth data line, which are sequentially arranged, intersect a first scan line, a second scan line, and a third scan line, which are sequentially arranged, for forming eight pixel units, which comprises a ninth pixel unit, a tenth pixel unit, a eleventh pixel unit, and a twelfth pixel unit sequentially arranged in a first row and comprises a thirteenth pixel unit, a fourteenth pixel unit, a fifteenth pixel unit, and an sixteenth pixel unit sequentially arranged in a second row. The eight pixel units are designated as a pixel unit set.

In the first row of the four pixel units, the ninth pixel unit and the twelfth pixel unit are respectively coupled to the second data line and the fourth data line, and both the tenth pixel unit and the eleventh pixel unit are coupled to the third data line.

In the second row of the four pixel units, the thirteenth pixel unit and the sixteenth pixel unit are respectively coupled to the first data line and the fifth data line, and the fourteenth pixel unit and the fifteenth pixel unit are respectively coupled to the second data line and the fourth data line.

In the LCD panel of the present invention, in the first row of the pixel units, both the ninth pixel unit and the eleventh pixel unit are coupled to the second scan line, and both the tenth pixel unit and the twelfth pixel unit are coupled to the first scan line.

In the second row of the four pixel units, both the thirteenth pixel unit and the fifteenth pixel unit are coupled to the second scan line, and both the fourteenth pixel unit and the sixteenth pixel unit are coupled to the third scan line.

In the LCD panel of the present invention, a thin film transistor is disposed in each of the pixel units. In one row of the four pixel units of the pixel unit set, sources of the thin film transistors of the first pixel unit and the fourth pixel unit are respectively coupled to the first data line and the fifth data line, and sources of the thin film transistors of the second pixel unit and the third pixel unit are respectively coupled to the second data line and the fourth data line.

In the another row of the four pixel units of the pixel unit set, sources of the thin film transistors of the fifth pixel unit and the eighth pixel unit are respectively coupled to the second data line and the fourth data line, and both sources of the thin film transistors of the sixth pixel unit and the seventh pixel unit are coupled to the third data line.

In the LCD panel of the present invention, gates of the thin film transistors of the pixel units coupled to an identical data line are coupled to different scan lines.

In comparison with the prior art, the LCD panel of the present invention can realize the 1+2 dot inversion without continuously switching the polarities of the data lines. Thus, the power consumption of the LCD panel of the present invention is greatly reduced.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
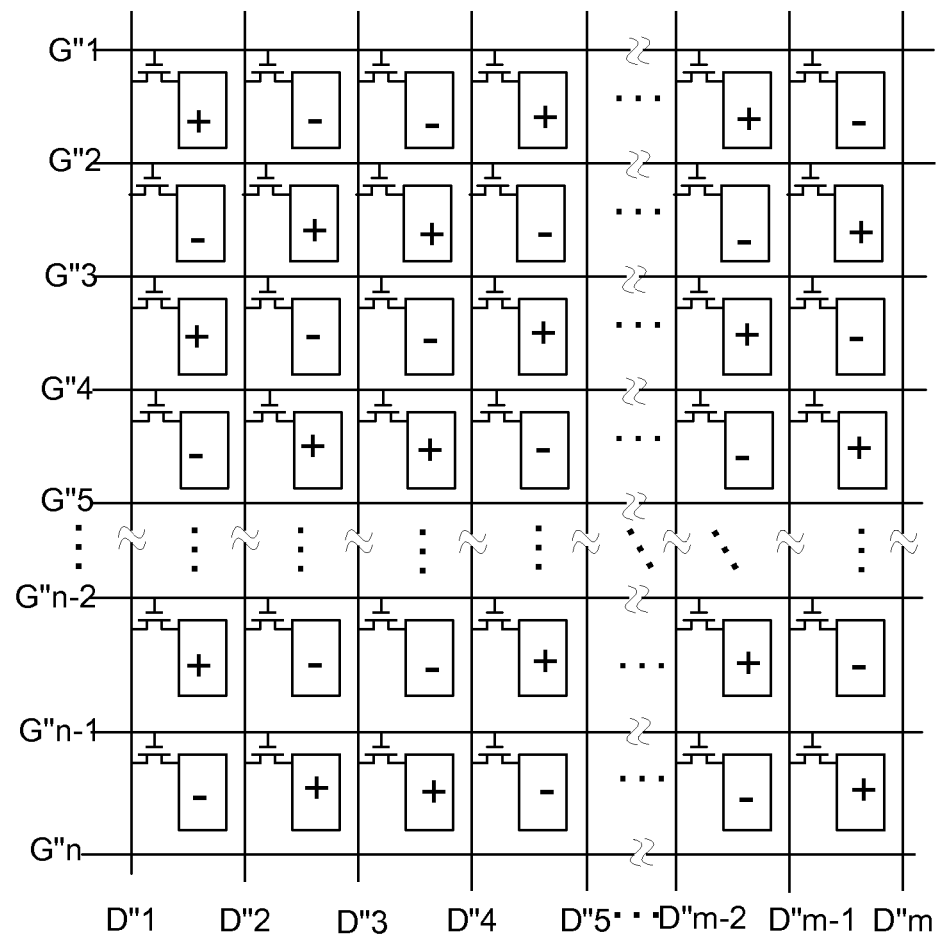
FIG. 1 is a schematic drawing illustrating pixel structures of an LCD panel of the prior art.
Figure 2:
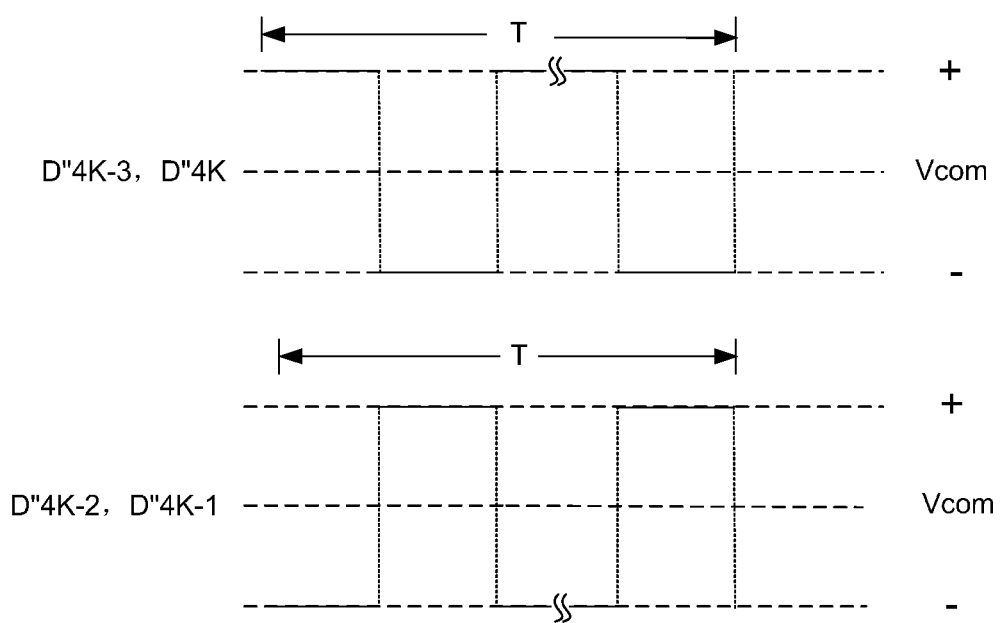
FIG. 2 is a schematic drawing illustrating voltage waveforms of the data lines of the LCD panel driven by using the 1+2 dot inversion of FIG. 1.
Figure 3:
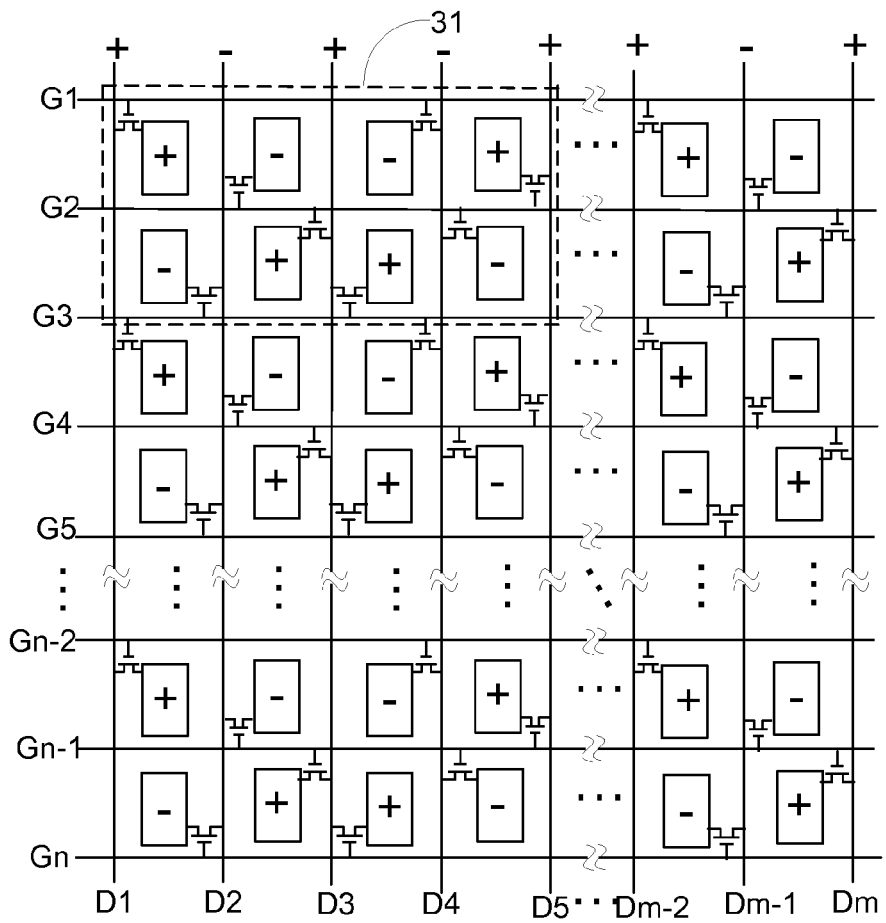
FIG. 3 is a schematic drawing illustrating pixel structures of an LCD panel according to a first preferred embodiment of the present invention.

FIG. 3 is a schematic drawing illustrating an LCD panel according to a first preferred embodiment of the present invention.

The LCD panel includes m data lines D1~Dm, and n scan lines G~Gn, in which m and n are nature number. The data line and the scan line herein are perpendicular and intersecting each other. It is not hard to see that two adjacent data lines intersect two adjacent scan lines to define a pixel unit (not labeled). There are a thin film transistor (not labeled) and a liquid crystal capacitor (not shown) disposed in each pixel unit. The scan lines are utilized to provide scanning signals for the pixel units. The data lines are utilized to provide grayscale voltages for the pixel units.

Figure 4:
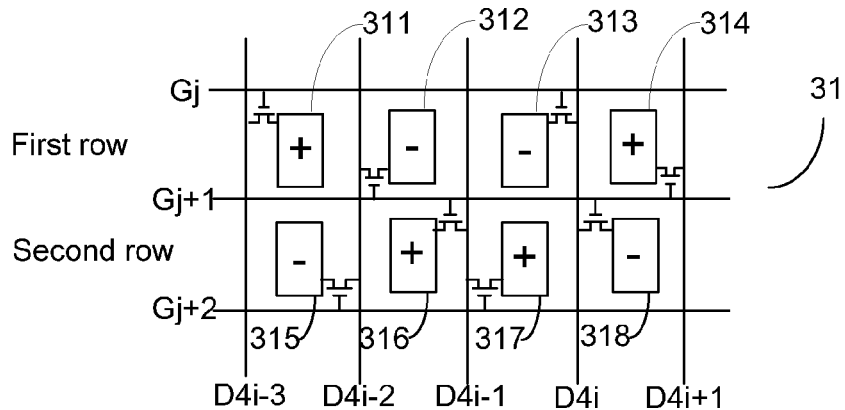
FIG. 4 is a schematic drawing illustrating a pixel unit set of the LCD panel shown in FIG. 3.

Referring to FIG. 4 and FIG. 3, A first data line D4$i$−3, a second data line D4$i$−2, a third data line D4$i$−1, a fourth data line D4$i$, and a fifth data line D4$i$+1, all of which are sequentially adjacent, intersect a first scan line Gj, a second scan line Gj+1, and a third scan line, which are sequentially arranged, for forming eight pixel units. The eight pixel units includes a first pixel unit 311, a second pixel unit 312, a third pixel unit 313, and a fourth pixel unit 314 sequentially arranged in an identical row and comprises a fifth pixel unit 315, a sixth pixel unit 316, a seventh pixel unit 317, and an eighth pixel unit 318 sequentially arranged in another row. The eight pixel units are designated as a pixel unit set 31, and i as well as j are nature numbers, and 1≤4$i$−3<4$i$+1≤m, 1≤j<j+2≤n.

In the first row of the four pixel units of the pixel unit set 31, the first pixel unit 311 and the fourth pixel unit 314 are respectively coupled to the first data line D4$i$−3 and the fifth data line D4$i$+1. The second pixel unit 312 and the third pixel unit 313 are respectively coupled to the second data line D4$i$−2 and the fourth data line D4$i$. In the second row of the four pixel units, The fifth pixel unit 315 and the eighth pixel unit 318 are respectively coupled to the second data line D4$i$−2 and the fourth data line D4$i$. Both the sixth pixel unit 316 and the seventh pixel unit 317 are coupled to the third data line D4$i$−1.

In the pixel unit set 31, the adjacent pixel units in the identical row of the four pixel units are provided scanning signals by two adjacent scan lines which are adjacent at the identical row. Specifically, in the four adjacent pixel units of the first row, gates of the thin film transistors of the first pixel unit 311 and the third pixel unit 313 are coupled to the first scan line Gj, and gates of the thin film transistors of the second pixel unit 312 and the fourth pixel unit 314 are coupled to the second scan line Gj+1. In the second row of the four pixel units, gates of the thin film transistors of the fifth pixel unit 315 and the seventh pixel unit 317 are coupled to the third scan line Gj+2, and gates of the thin film transistors of the sixth pixel unit 316 and the eighth pixel unit 318 are coupled to the second scan line Gj+1.

Figure 5:
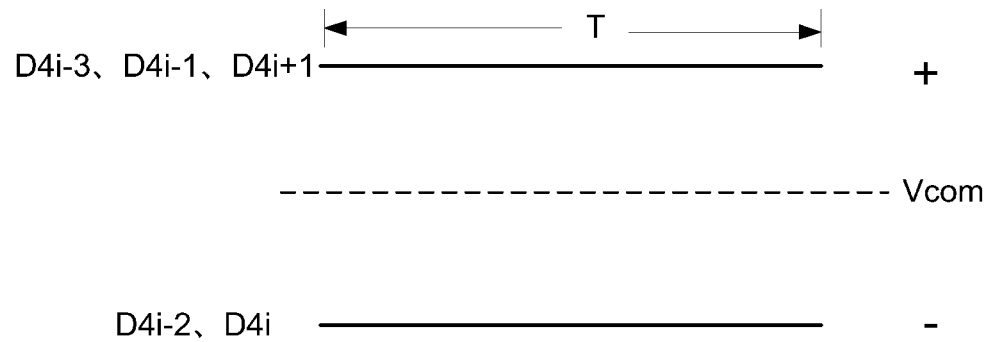
FIG. 5 is a schematic drawing illustrating voltage waveforms of the data lines of the LCD panel driven by using the 1+2 dot inversion of FIG. 3.

Referring to FIG. 5, FIG. 5 is a schematic drawing illustrating waveforms of the data lines of the LCD panel driven by using the 1+2 dot inversion in FIG. 3. The polarity of the grayscale voltage of each of the data lines remains unchanged for a frame time T, and the two adjacent data lines are provided the grayscale voltages with two opposite polarities. In the embodiment, the grayscale voltages of the first data line D4$i$−3, the third data line D4$i$−1, and the fifth data line D4$i$+1 of odd number columns have a positive polarity (i. e., the voltages are higher than a common voltage). The grayscale voltages of the second data line D4$i$−2, the fourth data line D4$i$ of even number columns have a negative polarity (i. e. the voltages are lower than a common voltage).

Referring to FIG. 4 and FIG. 5, a driving method of the pixel unit set 31 of the LCD panel is described as follows.

First, the first scan line Gj provides a scanning signal, and the thin film transistors of the first pixel unit 311 and the third pixel unit 313 are turned on; meanwhile, the first data line D4$i$−3 provides a grayscale voltage with a positive polarity to the first pixel unit 311, and the fourth data line D4$i$ provides a grayscale voltage with a negative polarity to the third pixel unit 313.

Then the second scan line Gj+1 provides a scanning signal, and the thin film transistors of the second pixel unit 312, the fourth pixel unit 314, the sixth pixel unit 316 and the eighth pixel unit 318 are turned on simultaneously. Meanwhile, the second data line D4$i$−2 provides a grayscale voltage with a negative polarity to the second pixel unit 312. The third data line D4$i$−1 provides a grayscale voltage with a positive polarity to the sixth pixel unit 316. The fourth data line D4$i$ provides a grayscale voltage with a negative polarity to the eighth pixel unit 318. The fifth data line D4$i$+1 provides a grayscale voltage with a positive polarity to the fourth pixel unit 314.

Finally, the third scan line Gj+2 provides a scanning signal, and the thin film transistors of the fifth pixel unit 315 and the seventh pixel unit 317 are turned on; meanwhile, the second data line D4$i$−2 provides a grayscale voltage with a negative polarity to the fifth pixel unit 315, and the third data line D4$i$−1 provides a grayscale voltage with a positive polarity to the seventh pixel unit 317.

As mentioned above, the grayscale voltages with the positive polarity of the first data line D4$i$−3, the third data line D4$i$−1, and the fifth data line D4$i$+1 are provided for the first pixel unit 311 and the fourth pixel unit 314 at two sides of the first row of the four pixel units as well as for the sixth pixel unit 316 and the seventh pixel unit 317 at a middle of second row of the four pixel units. the grayscale voltages with the negative polarity of the second data line D4$i$−2 and the fourth data line D4$i$ are provided for the second pixel unit 312 and the third pixel unit 313 at a middle of the first row of the four pixel units as well as for the fifth pixel unit 315 and the eighth pixel unit 318 at two sides of second row of the four pixel units. A driving method of other pixel unit sets 31 is identical to the driving method of the pixel unit set 31. Therefore, the grayscale voltages with the positive polarity of the first data line D4$i$−3, the third data line D4$i$−1, and the fifth data line D4$i$+1 located at the odd columns are written into the first pixel unit 311 and the fourth pixel unit 314 at the two sides of the first row of each pixel unit set 31, as well as written into the sixth pixel unit 316 and the seventh pixel unit 317 at the middle of the second of each pixel unit set 31. The pixel units, which are written into the grayscale voltage with the negative polarity of the second data line D4$i$−2 and the fourth data line D4$i$ located at the even columns, are alternate with the pixel units, which are written into the grayscale voltage with the positive polarity of the first data line D4$i$−3, the third data line D4$i$−1, and the fifth data line D4$i$+1 at the odd columns, thereby achieving the 1+2 dot inversion as shown in FIG. 3.

In comparison with the prior art, the LCD panel of the present invention can realize the 1+2 dot inversion without continuously switching the polarities of the grayscale voltages on the data lines. Thus, the power consumption of the LCD panel of the present invention is greatly reduced.

Figure 6:
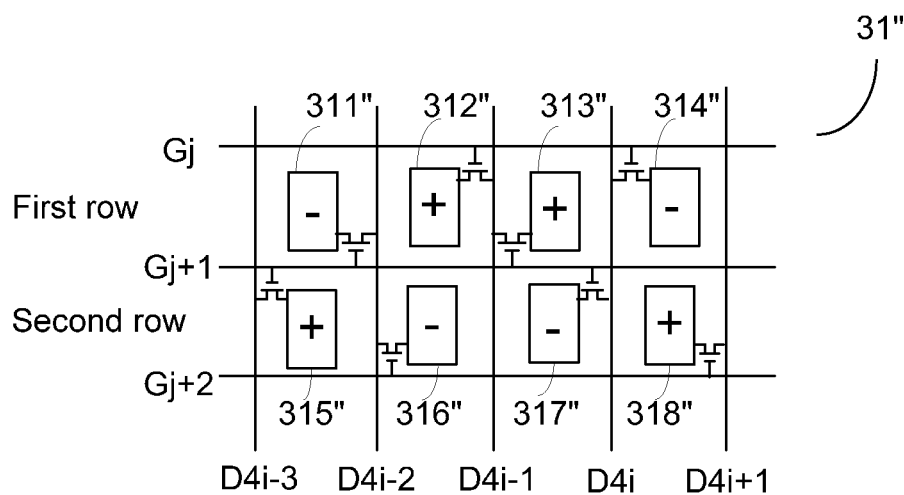
FIG. 6 is a schematic drawing illustrating a pixel unit set of an LCD panel according to a second preferred embodiment of the present invention.

Referring to FIG. 6, the pixel unit set of the LCD panel in the second embodiment are substantially identical to the pixel unit set in the first embodiment of the present invention, the difference therebetween is that the configurations of the pixel units at the first row and the second row are exchanged. Specifically, the pixel unit set 31" includes a ninth pixel unit 311", a tenth pixel unit 312", a eleventh pixel unit 313", and a twelfth pixel unit 314" arranged in a first row as well as a thirteenth pixel unit 315", a fourteenth pixel unit 316", a fifteenth pixel unit 317", and an sixteenth pixel unit 318" arranged in a second row.

In the first row of the four pixel units, The ninth pixel unit 311" and the twelfth pixel unit 314" are respectively coupled to the second data line D4$i$−2 and the fourth data line D4$i$, and both the tenth pixel unit 312" and the eleventh pixel unit 313" are coupled to the third data line D4$i$−1. In the second row of the four pixel units, the thirteenth pixel unit 315" and the sixteenth pixel unit 318" are respectively coupled to the first data line D4$i$−3 and the fifth data line D4$i$+1, and the fourteenth pixel unit 316" and the fifteenth pixel unit 317" are respectively coupled to the second data line D4$i$−2 and the fourth data line D4$i$.

In the four adjacent pixel units of the first row, the gates of the thin film transistors of the ninth pixel unit 311" and the eleventh pixel unit 313" are coupled to the second scan line Gj+1, and the gates of the thin film transistors of the tenth pixel unit 312" and the twelfth pixel unit 314" are coupled to the first scan line Gj. In the second row of the four pixel units, the gates of the thin film transistors of the thirteenth pixel unit 315" and the fifteenth pixel unit 317" are coupled to the second scan line Gj+1, and the gates of the thin film transistors of the fourteenth pixel unit 316" and the sixteenth pixel unit 318" are coupled to the third scan line Gj+2.

The LCD panel of the present invention is not limited to the embodiments. For example, the coupling relation between the gates of the thin film transistors of the pixel units and the scan lines can be changed, while it can be conformed that the gates of the thin film transistors of the pixel units in an identical data line are coupled to different scan lines.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An LCD panel, comprising a plurality of data lines and a plurality of scan lines, the data lines being perpendicular and intersecting the scan lines, two adjacent data lines intersecting two adjacent scan lines to define a pixel unit, characterized in that:

a first data line, a second data line, a third data line, a fourth data line, and a fifth data line, which are sequentially arranged, intersect a first scan line, a second scan line, and a third scan line, which are sequentially arranged, for forming eight pixel units, which comprises a first pixel unit, a second pixel unit, a third pixel unit, and a fourth pixel unit sequentially arranged in an identical row and comprises a fifth pixel unit, a sixth pixel unit, a seventh pixel unit, and an eighth pixel unit sequentially arranged in another row, wherein the eight pixel units are designated as a pixel unit set;

wherein in the identical row of the four pixel units, the first pixel unit and the fourth pixel unit are respectively coupled to the first data line and the fifth data line, and the second pixel unit and the third pixel unit are respectively coupled to the second data line and the fourth data line;

wherein in the another row of the four pixel units, the fifth pixel unit and the eighth pixel unit are respectively coupled to the second data line and the fourth data line, and both the sixth pixel unit and the seventh pixel unit are coupled to the third data line;

wherein the first pixel unit and the third pixel unit are coupled to the first scan line, and all the second pixel unit, the fourth pixel unit, the sixth pixel unit, and the eighth pixel unit are coupled to the second scan line, and both the fifth pixel unit and the seventh pixel unit are coupled to the third scan line, a thin film transistor being disposed in each of the pixel units;

wherein in the identical row of the four pixel units of the pixel unit set, sources of the thin film transistors of the first pixel unit and the fourth pixel unit are respectively coupled to the first data line and the fifth data line, sources of the thin film transistors of the second pixel unit and the third pixel unit are respectively coupled to the second data line and the fourth data line;

wherein in the another row of the four pixel units of the pixel unit set, sources of the thin film transistors of the fifth pixel unit and the eighth pixel unit are respectively coupled to the second data line and the fourth data line, and both sources of the thin film transistors of the sixth pixel unit and the seventh pixel unit are coupled to the third data line.

2. The LCD panel according to claim 1, characterized in that the pixel units coupled to an identical data line are respectively coupled to different scan lines.

3. The LCD panel according to claim 2, characterized in that the first data line, the second data line, the third data line, the fourth data line, and the fifth data line, which are sequentially arranged, intersect the first scan line, the second scan line, and the third scan line, which are sequentially arranged, for forming eight pixel units, which comprises a ninth pixel unit, a tenth pixel unit, a eleventh pixel unit, and a twelfth pixel unit sequentially arranged in a first row and comprises a thirteenth pixel unit, a fourteenth pixel unit, a fifteenth pixel unit, and an sixteenth pixel unit sequentially arranged in a second row, the eight pixel units being designated as a pixel unit set;

wherein in the first row of the four pixel units, the ninth pixel unit and the twelfth pixel unit are respectively coupled to the second data line and the fourth data line, and both the tenth pixel unit and the eleventh pixel unit are coupled to the third data line;

wherein in the second row of the four pixel units, the thirteenth pixel unit and the sixteenth pixel unit are respectively coupled to the first data line and the fifth data line, and the fourteenth pixel unit and the fifteenth pixel unit are respectively coupled to the second data line and the fourth data line.

4. The LCD panel according to claim 3, characterized in that in the first row of the pixel units, both the ninth pixel unit and the eleventh pixel unit are coupled to the second scan line, and both the tenth pixel unit and the twelfth pixel unit are coupled to the first scan line;
  wherein in the second row of the four pixel units, both the thirteenth pixel unit and the fifteenth pixel unit are coupled to the second scan line, and both the fourteenth pixel unit and the sixteenth pixel unit are coupled to the third scan line.

5. The LCD panel according to claim 1, characterized in that gates of the thin film transistors of the pixel units coupled to an identical data line are coupled to different scan lines.

6. An LCD panel, comprising a plurality of data lines and a plurality of scan lines, the data lines being perpendicular and intersecting the scan lines, two adjacent data lines intersecting two adjacent scan lines to define a pixel unit, characterized in that:
  a first data line, a second data line, a third data line, a fourth data line, and a fifth data line, which are sequentially arranged, intersect a first scan line, a second scan line, and a third scan line, which are sequentially arranged, for forming eight pixel units, which comprises a first pixel unit, a second pixel unit, a third pixel unit, and a fourth pixel unit sequentially arranged in an identical row and comprises a fifth pixel unit, a sixth pixel unit, a seventh pixel unit, and an eighth pixel unit sequentially arranged in another row, the eight pixel units being designated as a pixel unit set;
  wherein in the identical row of the four pixel units, the first pixel unit and the fourth pixel unit are respectively coupled to the first data line and the fifth data line, and the second pixel unit and the third pixel unit are respectively coupled to the second data line and the fourth data line;
  wherein in the another row of the four pixel units, the fifth pixel unit and the eighth pixel unit are respectively coupled to the second data line and the fourth data line, and both the sixth pixel unit and the seventh pixel unit are coupled to the third data line.

7. The LCD panel according to claim 6, characterized in that the pixel units coupled to an identical data line are respectively coupled to different scan lines.

8. The LCD panel according to claim 7, characterized in that in the identical row of the four pixel units of the pixel unit set, the first pixel unit and the fourth pixel unit are respectively coupled to the first data line and the fifth data line, and the second pixel unit and the third pixel unit are respectively coupled to the second data line and the fourth data line;
  in the another row of the four pixel units of the pixel unit set, the fifth pixel unit and the eighth pixel unit are respectively coupled to the second data line and the fourth data line, and both the sixth pixel unit and the seventh pixel unit are coupled to the third data line.

9. The LCD panel according to claim 8, characterized in that the first pixel unit and the third pixel unit are coupled to the first scan line, and all the second pixel unit, the fourth pixel unit, the sixth pixel unit, and the eighth pixel unit are coupled to the second scan line, and both the fifth pixel unit and the seventh pixel unit are coupled to the third scan line, in which a thin film transistor is disposed in each of the pixel units.

10. The LCD panel according to claim 7, characterized in that the first data line, the second data line, the third data line, the fourth data line, and the fifth data line, which are sequentially arranged, intersect the first scan line, the second scan line, and the third scan line, which are sequentially arranged, for forming eight pixel units, which comprises a ninth pixel unit, a tenth pixel unit, a eleventh pixel unit, and a twelfth pixel unit sequentially arranged in a first row and comprises a thirteenth pixel unit, a fourteenth pixel unit, a fifteenth pixel unit, and a sixteenth pixel unit sequentially arranged in a second row; wherein the eight pixel units are designated as a pixel unit set;
  wherein in the first row of the four pixel units, the ninth pixel unit and the twelfth pixel unit are respectively coupled to the second data line and the fourth data line, and both the tenth pixel unit and the eleventh pixel unit are coupled to the third data line;
  wherein in the second row of the four pixel units, the thirteenth pixel unit and the sixteenth pixel unit are respectively coupled to the first data line and the fifth data line, and the fourteenth pixel unit and the fifteenth pixel unit are respectively coupled to the second data line and the fourth data line.

11. The LCD panel according to claim 10, characterized in that in the first row of the pixel units, both the ninth pixel unit and the eleventh pixel unit are coupled to the second scan line, and both the tenth pixel unit and the twelfth pixel unit are coupled to the first scan line;
  wherein in the second row of the four pixel units, both the thirteenth pixel unit and the fifteenth pixel unit are coupled to the second scan line, and both the fourteenth pixel unit and the sixteenth pixel unit are coupled to the third scan line.

12. The LCD panel according to claim 7, characterized in that a thin film transistor is disposed in each of the pixel units, wherein in the identical row of the four pixel units of the pixel unit set, sources of the thin film transistors of the first pixel unit and the fourth pixel unit are respectively coupled to the first data line and the fifth data line, sources of the thin film transistors of the second pixel unit and the third pixel unit are respectively coupled to the second data line and the fourth data line; in the another row of the four pixel units of the pixel unit set, sources of the thin film transistors of the fifth pixel unit and the eighth pixel unit are respectively coupled to the second data line and the fourth data line, and both sources of the thin film transistors of the sixth pixel unit and the seventh pixel unit are coupled to the third data line.

13. The LCD panel according to claim 12, characterized in that gates of the thin film transistors of the pixel units coupled to an identical data line are coupled to different scan lines.

* * * * *